United States Patent
Curley et al.

(10) Patent No.: US 10,334,461 B2
(45) Date of Patent: Jun. 25, 2019

(54) SYSTEM, DEVICE AND METHOD FOR TESTING APP PERFORMANCE

(71) Applicant: Spirent Communications, PLC, West Sussex (GB)

(72) Inventors: Jon Curley, Cardiff (GB); Mark Hayward, Cardiff (GB); Simon Dawe, Cardiff (GB); James Patten, Cardiff (GB); Anthony James Gray, Newport (GB); Leon Cottrell, Cardiff (GB)

(73) Assignee: EPITIRO HOLDINGS, INC., Frederick, MD (US)

( * ) Notice: Subject to any disclaimer, the term of this patent is extended or adjusted under 35 U.S.C. 154(b) by 121 days.

(21) Appl. No.: 14/200,683

(22) Filed: Mar. 7, 2014

(65) Prior Publication Data

US 2015/0257021 A1 Sep. 10, 2015

(51) Int. Cl.
*H04W 4/02* (2018.01)
*H04W 24/08* (2009.01)

(52) U.S. Cl.
CPC .......... *H04W 24/08* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 7,558,211 B2 | 7/2009 | Cahn | |
| 7,640,020 B2 | 12/2009 | Gutowski | |
| 7,796,526 B2 | 9/2010 | Miller | |
| 8,023,418 B2 | 9/2011 | Curley | |
| 8,654,660 B2 | 2/2014 | Ketonen | |
| 2007/0081469 A1* | 4/2007 | Tracy | H04W 24/02 370/252 |
| 2011/0096678 A1* | 4/2011 | Ketonen | H04L 12/2602 370/252 |
| 2011/0231821 A1* | 9/2011 | Sahni | G06F 11/3688 717/124 |
| 2013/0055280 A1* | 2/2013 | Kruglick | G06F 9/5027 718/104 |
| 2013/0254897 A1* | 9/2013 | Reedy | G06F 21/10 726/26 |
| 2013/0279354 A1* | 10/2013 | Ekman | H04W 24/00 370/252 |
| 2014/0047413 A1* | 2/2014 | Sheive | H04L 65/403 717/110 |
| 2014/0237455 A1* | 8/2014 | Koneru | G06F 11/3688 717/131 |
| 2015/0081758 A1* | 3/2015 | Lee | H04L 43/50 709/201 |
| 2016/0066232 A1* | 3/2016 | Wang | H04W 48/18 370/332 |

* cited by examiner

*Primary Examiner* — Hermon Asres
(74) *Attorney, Agent, or Firm* — Haynes Beffel & Wolfeld LLP; Ernest J. Beffel, Jr.; Andrew L. Dunlap (57) ABSTRACT

An automated solution for measuring the performance of one or more selected apps across a wireless network, from a given location. The device of the invention, which may be termed a 'probe', performs the automation and validation of a range of apps with their respective cloud services, the probe including a local interface for receiving from a remote controller the credentials intended for testing the target app service if applicable. The invention can be used to generate an alert when the performance of a particular app at the location fails to meet certain criteria. It can also be sued to generate a report relating to the app performance at the location.

21 Claims, 5 Drawing Sheets

SYSTEM, DEVICE AND METHOD FOR TESTING APP PERFORMANCE

BACKGROUND OF THE INVENTION

1. Field of the Invention

The present invention relates to test techniques and test apparatus for remote autonomous validation of wireless app performance. More specifically, the subject matter relates to methods, systems, and apparatus for remote, autonomous testing and/or measuring of overall app service accessibility, availability and related performance.

2. Description of Related Art

Wireless network subscribers access online services using apps on their devices (smartphones, tablets, PCs) and network subscriber terminal equipment. This network subscriber terminal equipment includes cell sites and smaller wireless access points (APs), with related network routers and network switches that are further connected to an external backhaul transport mechanism such as copper line, microwave link, Wi-Fi, WiMax, cable, optical fiber or other transmission medium.

Various categories of app-based communication are possible through these packet-based networks, including data, video and voice. For example, voice over Internet protocol (VoIP) apps such as Skype, enable voice to be carried over wireless networks using Internet protocol (IP) communications. Video streaming apps, such as YouTube, allow digitized video imagery to be transmitted using these same wireless networks. Social media networks, such as Twitter and Facebook, allow files, images and messages to be exchanged between groups of connected people. Additionally file transfer and backup apps, such as DropBox, allow further app specific wireless transmissions on this same basis.

It should be noted that the term 'app' as used herein refers to a piece of software (an 'application') designed to fulfill a particular purpose, as opposed to system software. Such a program may, for example, be downloaded by a user to a mobile device. However, the invention is not intended to be limited in regard to the type or nature of the app being tested, the type of device on which it may be executed by users, or the method of installation.

While wireless service providers strive to avoid problems that affect subscribers' app performance, problems still often arise. This can be a problem for organizations where performance problems affect app users at their site. For example, if guests experience difficulties in accessing or using popular apps such as Facebook, YouTube, Twitter etc at a particular hotel, this may dissuade those app users from re-visiting that hotel in the future.

When app performance problems arise at a given location, the ability to remotely diagnose and validate those problems has been limited to date. Various centralized tools exist in the art for passive diagnosis and validation of subscriber performance by analyzing information from the network transmissions, or transmitted from the subscriber's own device, such as location and signal quality. A determination on how to proceed with correcting the issue may be made based on the list of diagnostic results that are available but, by their nature, these are only very general assessments of the actual app service delivery. Therefore, decisions and strategies for addressing the problem will be made using information that is not sufficiently detailed or focused, leading to ineffective solutions.

Additionally, many complaints are received from subscribers about quality issues relating to a specific app but these issues are not available or visible to the network operator from the packet-layer network information available.

Currently, in order to ensure that app service is accessible and performing from the subscriber perspective, it is considered best practice to send an engineer to visit a site or location with recurring sub-par app performance reports, validate whether or not a fault or faults actually exists and determine where the fault lies. This process is time-consuming and costly. In such cases, various RF test instruments such as spectrum analyzers, vector signal analyzers, vector signal generators and RF power meters are used to test these remote environments. Parameters of the test instruments and wireless network devices under test are manually set by operators so as to manually perform RF measurements and record network-layer data.

Furthermore, other aspects of the environment and set-up, such as network components and access lines must be further isolated and validated without the localized environmental element of the on-site equipment. Then, all of this data is analyzed manually to identify the root cause or causes of the degraded app performance to generate a service validation report—such a process is time-consuming, susceptible to errors and expensive. Additionally, app performance variations are transient by time-of-day or day-of-week or month or based on the number of users in a particular location at any one time and cannot be solved other than having an engineer on site 24×7 to determine such fluctuation in demand.

Therefore, there is a need to validate app performance visibility by locale for a network service, on an ongoing basis, so as to overcome the above-described drawbacks. Such an improved solution has now been devised.

BRIEF SUMMARY OF THE INVENTION

Accordingly, and in light of these shortcomings, a need exists for methods, systems and apparatus for remotely validating app performance in an automated mode. In view of this, an object of the present invention is to provide a method and apparatus for remote, active validation of app performance on a network and a system thereof, so as to save manual power and costs.

Another object of the present invention is to provide a method for validating and understanding app-specific performance on a wireless network and a system thereof, so as to reduce the measurement time, increase data accuracy and avoid unnecessary errors and improve the mean time-to-repair (MTTR).

The invention provides a device, a system and corresponding method for validating or measuring performance between an app executed on a remote wireless terminal and its related online service or range of services located on a remote network or networks. The invention is particularly suited for determining and detecting app-related performance issues at a selected location or locations. It is also particularly suited for use at locations where testing of app performance needs to be conducted without the presence of an on-site technician. It is also particularly suited for capturing and analyzing performance-related data so that app performance can be monitored on an on-going basis and/or related reports can be generated.

Embodiments of the present invention may provide systems, methods and apparatus for remotely testing, measuring and validating wireless app performance. The apparatus may comprise a locally sited device that serves as a probe, capable of connecting to a target network cell site, access point (AP) or set of access points (APs) of a geographically remote network.

The locally sited, automated validation apparatus may automate the surveillance and evaluation of app activity and associated wireless network communication intended for the app's target cloud-hosted service at distributed locations on the network provider network.

The apparatus may conduct the automated testing and validation of a range of apps with their respective cloud services (such YouTube, Facebook, Spotify, Twitter and others), the apparatus including a local interface for receiving from a remote controller the credentials intended for testing the target app service if applicable. The controller may be a server located remotely from the probe.

The present invention may further provide a system for testing or validating a wireless network device, comprising: a setting module for setting app parameters, the setting module comprising app login parameters of cloud service, a target service test (e.g. as a video URL), and/or a configurable number of app activities to be conducted by a test apparatus such as logging in, review a friend list, reviewing a timeline, reviewing photos, review messages, and so on—each specific to a particular app cloud service.

Therefore, by integrating the design and development of test apparatuses, the present invention eliminates or at least reduces the need for manual operations so as to save manual power and time, increase the test efficiency of the wireless network device and improve the utilization rate of the validation apparatuses, thereby increasing data accuracy, avoiding unnecessary errors and simplifying the validation process.

Thus, in accordance with the present invention there is provided a system, device and method as defined in the appended claims.

In accordance with the invention there may be provided a method for testing or measuring the performance of an app at a predetermined location, comprising:

providing a computing device at the location; and using the device to perform an automated test across a wireless network, the test comprising at least one electronic exchange between the device and a least one cloud-based service associated with the app.

The device may be a portable computing device. It may comprise hardware and software arranged to enable the device to communicate across the wireless network. It may comprise an antenna to enable said wireless communication. The device may be referred to as a 'probe' because it may be used for measuring, testing, or obtaining information relating to the performance of the app from the predetermined location. It may comprise one or more software components arranged and configured to capture and/or analyze data relating to the performance of the app across the network.

The app may be a mobile app or web app. The network may be a public network, such as the internet.

The test may be automated in the sense that it can be executed without manual intervention. The test may be related to the specific app that is being monitored. The test may involve initiating and executing the app upon a processor associated with the device. The test may be designed to comprise one or more actions associated with the execution of the app. For example, an app-related action may be an instruction to upload an image, or visit a specified web page/site, or download some data, or perform an update on a remote site.

More than one test may be performed in respect of the app. The performance of more than one app may be tested. The app may be selected from a plurality of apps configured for execution upon the device.

The method may comprise the step of establishing a connection with the wireless network. The device may be configured to establish a connection with the wireless network. This step may be automated, or may be initiated upon receipt of a signal from a remotely located device. The device may be configured to connect with a target network cell site, access point (AP) or set of access points (APs) of a geographically remote network.

The wireless network may comprise one or more wireless signal paths. The device may be configured to execute the app or test over the one or more signal paths. The method may include the step of changing to another signal path if execution of the app or test indicates that no service is available on the tested path.

The method may further comprise the step of repeating the test one or more times. The test may be repeated as a test pattern. The test pattern may repeat within a predetermined time period. The period of time may be varied. It may be varied in terms of duration of time period and/or when the pattern is initiated. The test or test pattern may be scheduled to start at a predetermined time. The predetermined time may be varied. The method may include the step of recording the time at which one or more test signals is launched onto and/or received from the signal path.

Performance of the test may involve modification of the test pattern or signal path. The test may comprise a sequence of electronic exchanges or communications between the app executing on the device and its related on-line cloud service server(s). The exchanges may be specific or related to the executed app.

The method may further comprise the step of capturing performance-related data generated as a result of performing said test. Additionally or alternatively, the method may further comprise the step of providing performance-related data generated as a result of performing said test. The performance-related data may be app validation measurements taken during execution of the test across the wireless network. For example, the data may comprise data relating to the length of time required to perform a specified action. The data may comprise an indication that a certain test action could not be successfully completed (i.e. failed).

Preferably, the method further comprises the step of storing the performance-related data; and/or analyzing the performance-related data. The data may be stored and/or analyzed by the device. Additionally or alternatively, it may be stored and/or analyzed by one or more other devices, which may not be provided at the same geographical location as the device.

The method may further comprise the step of transmitting the performance related data to a management resource. The data may be transmitted after it has been processed on the device. The data may be transmitted via the access point or points. It may be transmitted via the internet. It may be transmitted using a secure internet link. It may be transmitted at a scheduled time, or after the elapse of a predetermined time period. It may be transmitted upon request.

The method may further comprise the step of receiving configuration data from the management resource to control and/or influence the performance of the test.

The management resource may comprise a configuration module for storing the configuration data. Additionally or alternatively it may comprise an interface configured to enable a user to modify the configuration data.

The management resource may be configured to:
store the performance-related data;
generate an alert in response to the performance-related data transmitted by the device; and/or
generate a report based on at least a portion of the performance-related data.

The method may further comprise the step of recording when a test signal is launched onto the wireless network and/or received from a signal path.

The management resource may be configured to:
store at least one pre-determined performance parameter for the app;
receive the performance data from the device;
analyze the performance data relative to the at least one performance parameter in accordance with a set of rules to determine whether a performance incidence has occurred; and
generate a report and/or alert in the event that a performance incident has occurred.

The method may further comprise:
storing the at least one performance parameter and/or set of rules on a server;
receiving the performance data over the wireless communications network from the device; and/or
transmitting the report and/or alert to a destination.

Also in accordance with the invention there is provided a device corresponding to the device described above. The device may be termed a 'probe'. The device may be arranged and configured to perform some or all of the steps described above.

Thus, there may be provided a device for testing the performance of an app at a predetermined location, the device comprising hardware and software configured to:
automatically perform a test across a wireless network, the test comprising at least one electronic exchange between the device provided at the location and at least one cloud-based service associated with the app.

The device may be contained within a housing. It may be portable. It may be a dedicated device for the performance of the app-related test(s), rather than a general purpose computing device.

Also in accordance with the invention there is provided a system for testing the performance of an app from one or more predetermined locations, the system comprising:
a management resource; and
a device provided at each of the one or more locations, each device configured to:
perform an automated test across a wireless network, the test comprising at least one electronic exchange between the device and at least one cloud-based service associated with the app.

The device may be a device as described above. The system may be configured to perform the steps of the method described above.

The management resource may be configured to:
store at least one pre-determined performance parameter for the app;
receive the performance data from the device;
analyze the performance data relative to the at least one performance parameter in accordance with a set of rules to determine whether a performance incidence has occurred; and/or
generate a report and/or alert in the event that a performance incident has occurred.

The invention may provide automated incident reporting apparatus for reporting app performance incidents in a wireless communications network, based on a predetermined plurality of performance parameters for said app; the apparatus comprising: means operative to systematically compare app performance parameters selected from said plurality of parameters; and means responsive to said comparison to determine whether said parameters are equivalent in accordance with predetermined criteria, and in the event that said parameters are not equivalent, to report the non-equivalence as an app-related performance incident.

The features described above in relation to one aspect or embodiment of the invention may be present in any or all of the other embodiments or aspects of the invention.

These and other aspects of the present invention will be apparent from and elucidated with reference to, the illustrative embodiment described herein.

BRIEF DESCRIPTION OF THE DRAWINGS

An embodiment of the present invention will now be described, by way of example only, and with reference to the accompany drawings, in which.

DETAILED DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

Figure 1:
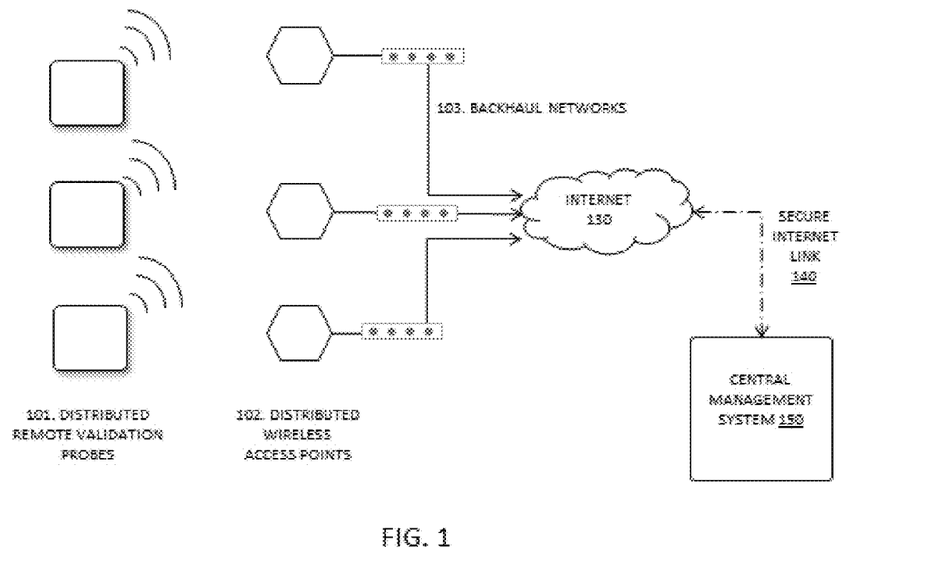
FIG. 1 provides a block diagram showing one embodiment of a system in accordance with the present invention.

Referring to FIG. 1, distributed remote validation probes 101, connect through distributed wireless access points (WAPs) 102 via, for example, wireless fidelity (WiFi) to perform app validation functions on a wireless network. The results of the app validation tests may be returned to the central management system 150 using the access point 102 and the backhaul network 103 in place and the internet 130 using a secure internet link 140.

Figure 2:
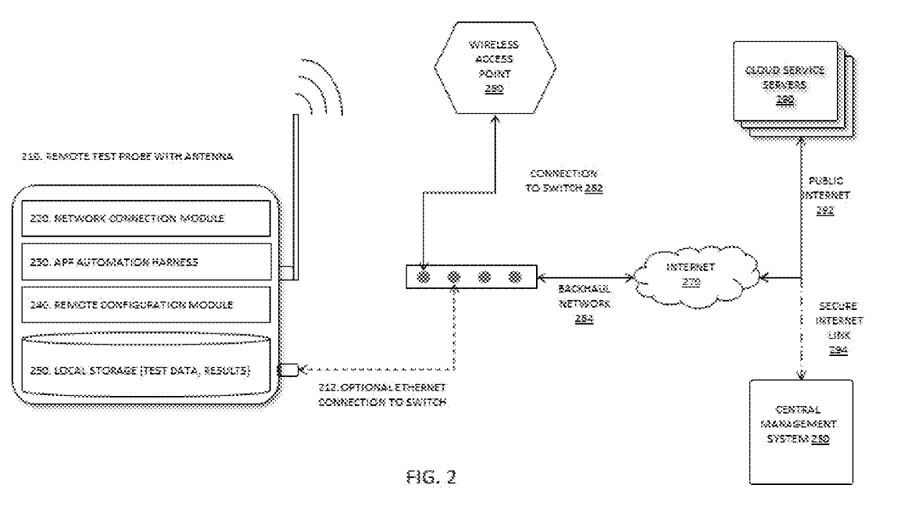
FIG. 2 is a detailed view of the validation apparatus in-situ at a remote location. The figure illustrates a network environment implementing a validation apparatus system for assuring performance of wireless apps, in accordance with an implementation of the present subject matter.

Referring to FIG. 2, the remote test probe with antenna 210 (e.g., a WiFi antenna), comprises a network connection module 220 that provides an interface to the wireless access point (WAP) 280 for establishing a WiFi connection with, for example, the WAP . Further, the test probe with antenna 210 includes a app automation harness 230 that is responsible for executing apps on the device and recording performance characteristics, a remote configuration module 240 that connects to the central management system 280 to retrieve pre-defined configuration options and local storage 250 that holds the gathered information —there may be a plurality of storage objects within the local storage 250.

The operation of the remote test probe with antenna 210 is based around autonomously connecting to the wireless access point 280 using, for example, WiFi, and the execution of individual apps. An app has a set of variable parameters, which depend largely on its type, for example, the Facebook app requires a validation test of that online service and requires a username and password, and the time at which the test should be executed on the remote test probe with antenna 210.

The app runs on the remote test probe with antenna 210 and makes app specific communications across the active network that are recorded by the remote test probe 210 and stored in the local storage 250. The local storage 250 holds information about the app validation measurements made on the network connection established. These results are returned to the central management system 150 using the access point 102 and the backhaul network 103 in place and the internet 130 using a secure internet link 140.

In the case of Facebook, for example, an illustrative validation sequence might execute as follows after initiation of the app harness:
 1. Direct app to login to Facebook online service using pre-configured username and password
   Record "time to login" to service—or log failure
 2. Direct app to user's timeline page
   Record time to download timeline—or log failure
 3. Direct app to user's Friends page
   Record time to perform action—or log failure
 4. Direct app to user's Profile page
   Record time to perform action—or log failure
 5. Direct app to upload a photo posting to the service
   Record time to perform action—or log failure
 6. Direct app to perform a status update
   Record time to perform a status update—or log failure In the case of YouTube, for example, an illustrative validation sequence might execute as follows after initiation of the app harness:
 1. Direct app to video URL
   Record "time to connect" to YouTube service—or log failure
 2. Direct app to play video
   Record "time to start playing" to YouTube service—or log failure
   Record "network throughput of video stream"
   Record "rebuffering events" during playback
   Record "duration of playback" or log failure Referring to FIG. 3, the central management system 300, comprises interfaces 310 to facilitate network connectivity and transmissions to/from the remote test probes 210 outlined in FIG. 2, processors 312, to perform all computer processing tasks related to the central management system 300, Memory 320, which providers computer memory storage for all processing and storage modules describer henceforth. The data collection module 322 is responsible for managing incoming data from the remote test probes 210 outlined in FIG. 2. The App config module 326, is responsible for interfacing with human users of the system, allowing definition of app requirements and storage of app parameters Service name (i.e. Facebook, YouTube), username, password, URLs and a plurality of other app-specific, optional related information.

Figure 3:
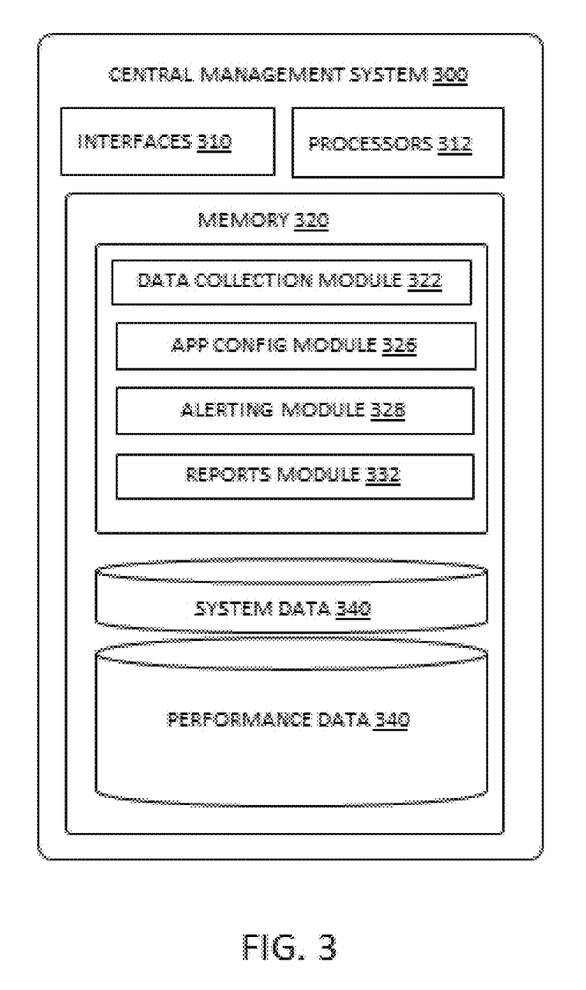
FIG. 3 is a diagram outlining the central management system and key modules utilized in normal operation of the apparatus and reporting system.

The system data 340 is responsible for storing configuration information related to the App config module 326 including app parameters.

The performance data 340, is responsible for storing app validation performance data and archiving this data over long periods of time.

An optional alerting module 328 is also included, which responds to incoming app validation and raises alerts using electronic transmissions such as SMS, Email, SNMP or otherwise.

An optional reports module 332 is also included, which provides reporting capability to end users of the system.

Figure 4:
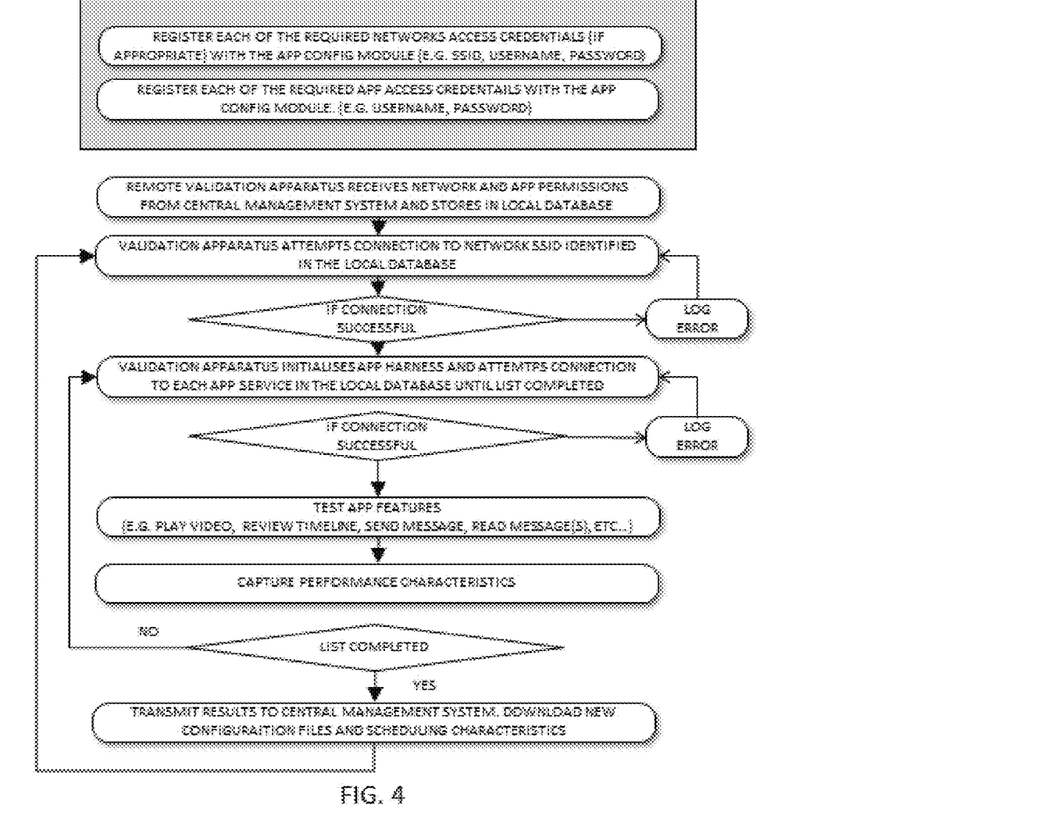
FIG. 4 is a block diagram outlining an operational sequence of network connections and app validation sequences as performed in accordance with the present invention.
Figure 5:
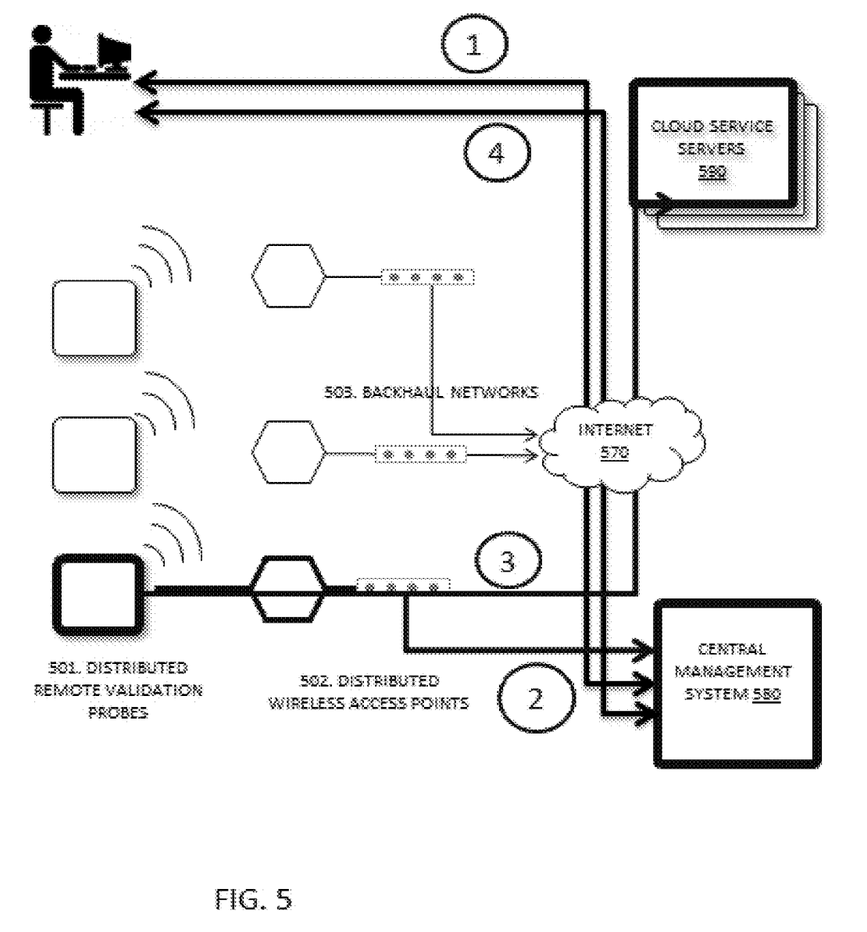
FIG. 5 illustrates an embodiment of the inventive system in operation to undertake an evaluation of the performance of an app from a location.

Referring to FIGS. 4 and 5, these outline a typical sequence of operations of the system in normal use. Referring to FIG. 5, the steps undertaken may be outlined as follows:
 1. The system operator logs into the central management system and configures login characteristics and test requirements for a specific probe or set of probes;
 2. The distributed probes connect to the central management system and download their test requirements as outlined by the system operator 3. The probes initiate the apps to connect to their respective cloud service servers and perform test sequences as directed. Once complete, the results are transmitted to the central management system 4. the operator has instant access to online results for tests outlined. Corrective measures may then be taken to address any performance related problems identified by the tests.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A method of monitoring wireless fidelity (WiFi) connection availability with a wireless access point (WAP) for connecting mobile applications running on mobile devices to the internet and generating alerts, the method including:
    operating a dedicated monitoring device at a location from which the WiFi connection availability with the WAP is to be monitored, the operating of the dedicated monitoring device including:
        running, on a processor of the dedicated monitoring device, a mobile device operating system;
        running, on the processor of the dedicated monitoring device, at least one app downloaded from a mobile app store for the mobile device operating system, the downloaded app being associated with a cloud service and having an application program interface;
        running, on the processor of the dedicated monitoring device, a test app that interacts with the downloaded app via the application program interface;
        receiving, by the test app, remotely generated control data after deployment to the dedicated monitoring device;
        monitoring, by the test app running on the dedicated monitoring device and interacting with the downloaded app via the application program interface, the WiFi connection availability with the WAP according to the remotely generated control data by (i) causing the downloaded app to communicate with the cloud service and (ii) evaluating responses from the cloud service;
        generating, by the test app, alerts or reports of the WiFi connection availability with the WAP based on the evaluating of the responses; and
        causing multiple downloaded apps running on the dedicated monitoring device to communicate with associated cloud services according to the remotely generated control data, the multiple downloaded apps including two or more of a video streaming app, a social media app, a file sharing or a backup app.

2. The method of claim 1, wherein the downloaded app is a video streaming app.

3. The method of claim 1, wherein the downloaded app is a YouTube(TM) app.

4. The method of claim 1, wherein the downloaded app is a social media app.

5. The method of claim 1, wherein the downloaded app is a Twitter(TM) or Facebook(TM) app.

6. The method of claim 1, wherein the downloaded app is a file sharing and backup app.

7. The method of claim 1, wherein the downloaded app is a DropBox(TM) app.

8. The method of claim 1, wherein the downloaded app is a voice over IP (VoIP) app.

9. The method of claim 1, wherein the downloaded app is a Skype(TM) app.

10. A system operating at least three dedicated monitoring devices monitoring WiFi connections with one or more WAPs and generating alerts to a central management system, the system operating the at least three dedicated monitoring devices by performing operations including:
    running, on a processor of at least one of the three dedicated monitoring devices, a mobile device operating system;
    running, on the processor of the at least one dedicated monitoring device, at least one app downloaded from a mobile app store for the mobile device operating system, the downloaded app being associated with a cloud service and having an application program interface;
    running, on the processor of the at least one dedicated monitoring device, a test app that interacts with the downloaded app via the application program interface;
    receiving, by the test app, remotely generated control data after deployment to the at least one dedicated monitoring device;
    monitoring, by the test app running on the at least one dedicated monitoring device and interacting with the downloaded app via the application program interface, wireless fidelity (WiFi) connection availability with a wireless access point (WAP) according to the remotely generated control data by (i) causing the downloaded app to communicate with the cloud service and (ii) evaluating responses from the cloud service;
    generating, by the test app, alerts or reports of the WiFi connection availability with the WAP based on the evaluating of the responses; and
    causing multiple downloaded apps running on the at least one dedicated monitoring device to communicate with associated cloud services according to the remotely generated control data, the multiple downloaded apps including two or more of a video streaming app, a social media app, a file sharing or a backup app.

11. The method of claim 1, wherein the remotely generated control data includes a configuration for the test app to log in to the associated cloud service, request a friend list, request a timeline, request photos, and request messages.

12. The method of claim 1, further including evaluating the responses from the cloud service to determine success of a user's logging in, time to download the user's timeline, time to access a friend's page, and time to access the user's profile.

13. The method of claim 1, further including evaluating the responses from the cloud service to determine success of a user's logging in, time to start playing a video, network throughput of the video, and rebuffering events during playback of the video.

14. The method of claim 1, further including applying the monitoring to both WiFi and cellular wireless connections from the dedicated monitoring device.

15. A device that monitors wireless fidelity (WiFi) connection availability with a wireless access point (WAP) for connecting mobile applications running on mobile devices to the internet and generating alerts, the device including:
    a dedicated monitoring device with a processor and memory, wherein the dedicated monitoring device further includes in the memory:
  a mobile device operating system;
  at least one app downloaded from a mobile app store for the mobile device operating system, the downloaded app being associated with a cloud service and having an application program interface; and
  a test app that implements:
    receiving remotely generated control data after deployment to the dedicated monitoring device;
    interacting with the downloaded app via the application program interface;
    monitoring, by the test app and interacting with the downloaded app via the application program interface, the WiFi connection availability to the WAP by (i) causing the downloaded app to communicate with a cloud service and (ii) evaluating responses from the cloud service;
    generating alerts or reports of the WiFi connection availability to the WAP based on the evaluating of the responses; and
    causing multiple downloaded apps running on the dedicated monitoring device to communicate with associated cloud services according to the remotely generated control data, the multiple downloaded apps including two or more of a video streaming app, a social media app, a file sharing or a backup app.

16. A system operating at least three dedicated monitoring devices monitoring WiFi connections and generating alerts to a central management system, at least one dedicated monitoring device of the at least three dedicated monitoring devices including:
  a processor and memory,
  wherein the at least one dedicated monitoring device further includes in the memory:
    a mobile device operating system;
    at least one app downloaded from a mobile app store for the mobile device operating system, the downloaded app being associated with a cloud service and having an application program interface; and
    a test app that implements:
      receiving remotely generated control data after deployment to the at least one dedicated monitoring device;
      interacting with the downloaded app via the application program interface;
      monitoring, by the test app and interacting with the downloaded app via the application program interface, wireless fidelity (WiFi) connection availability to a wireless access point (WAP) by (i) causing the downloaded app to communicate with a cloud service and (ii) evaluating responses from the cloud service;
      generating alerts or reports of the WiFi connection availability to the WAP based on the evaluating of the responses; and
      causing multiple downloaded apps running on the at least one dedicated monitoring device to communicate with associated cloud services according to the remotely generated control data, the multiple downloaded apps including two or more of a video streaming app, a social media app, a file sharing or a backup app.

17. The device of claim 15, wherein the remotely generated control data includes a configuration for the test app to log in to the associated cloud service, request a friend list, request a timeline, request photos, and request messages.

18. The device of claim 15, further including evaluating the responses from the cloud service to determine success of a user's logging in, time to download the user's timeline, time to access a friend's page, and time to access the user's profile.

19. The device of claim 15, further including evaluating the responses from the cloud service to determine success of a user's logging in, time to start playing a video, network throughput of the video, and rebuffering events during playback of the video.

20. The device of claim 15, further including applying the monitoring to both WiFi and cellular wireless connections from the dedicated monitoring device.

21. A method of a dedicated monitoring device monitoring wireless fidelity (WiFi) connection availability with a wireless access point (WAP) for connecting mobile applications to network subscriber terminal equipment including a distributed access point and a backhaul network for connecting to the internet and monitoring a performance of the mobile applications connecting to cloud service servers via the network subscriber terminal equipment, the method comprising:
  connecting the dedicated monitoring device to the distributed access point of the network subscriber terminal equipment;
  running a mobile device operating system on a processor of the dedicated monitoring device;
  running, on the processor of the dedicated monitoring device, at least one app downloaded from a mobile app store for the mobile device operating system, the downloaded app being associated with a cloud service and having an application program interface hosted at a cloud service server;
  running, on the processor of the dedicated monitoring device, a test app that interacts with the downloaded app;
  receiving, by the test app from a central management device, remotely generated control data for instructing the downloaded app to execute a specific function that includes communicating with the cloud service server, via the access point and the backhaul network, using the application program interface;
  executing, by the downloaded app, the specific function at the instruction of the test app by communicating with the cloud service server, via the access point and the backhaul network, using the application program interface;
  monitoring, by the test app running on the dedicated monitoring device, the WiFi connection availability with the WAP and a performance of the execution of the specific function of the downloaded app by evaluating responses from the cloud service through the cloud service server, the backhaul network and the access point to the dedicated monitoring device;
  generating, by the test app, a report of the WiFi connection availability with the WAP and performance based on results of the monitoring; and
  causing multiple downloaded apps running on the dedicated monitoring device to communicate with associated cloud services according to the remotely generated control data, the multiple downloaded apps including two or more of a video streaming app, a social media app, a file sharing or a backup app.

* * * * *